United States Patent [19]
Cazes

[11] Patent Number: 4,949,870
[45] Date of Patent: Aug. 21, 1990

[54] REINFORCED POURING ASSEMBLY AND ITS METHOD OF CONSTRUCTION

[75] Inventor: Michel Cazes, Vittel, France

[73] Assignee: Societe Generale Des Eaux Minerales De Vittel, Vittel, France

[21] Appl. No.: 180,866

[22] PCT Filed: Jun. 23, 1987

[86] PCT No.: PCT/FR87/00241
§ 371 Date: Mar. 2, 1988
§ 102(e) Date: Mar. 2, 1988

[87] PCT Pub. No.: WO88/00162
PCT Pub. Date: Jan. 14, 1988

[30] Foreign Application Priority Data
Jul. 2, 1986 [FR] France .................. 86 09702

[51] Int. Cl.⁵ .................................. B65D 17/00
[52] U.S. Cl. ......................... 222/81; 222/541; 493/213; 493/345; 493/929
[58] Field of Search ............... 222/81, 88, 90, 541; 56/293, 514, 517; 383/66, 80; 215/251, 257; 220/265, 267; 493/213, 345, 929

[56] References Cited

U.S. PATENT DOCUMENTS

| | | | |
|---|---|---|---|
| 3,231,444 | 1/1966 | Schick | 156/282 |
| 4,022,258 | 5/1977 | Steidley | 222/81 |
| 4,355,737 | 10/1982 | Pongrass . | |
| 4,362,255 | 12/1982 | Bond | 222/107 |
| 4,493,438 | 1/1985 | Rutter . | |

FOREIGN PATENT DOCUMENTS 2080472 11/1971 France .

Primary Examiner—Michael S. Huppert
Assistant Examiner—Steven Reiss
Attorney, Agent, or Firm—Weiser & Stapler

[57] ABSTRACT

A device for perforating a pack made of flexible synthetic material and having a closing-off and pouring assembly including a cylindrical shank and a plug for interacting with the shank and for cutting and perforating the pack in order to access a liquid contained in the pack, is improved by providing the shank with a reinforcement attached to and extending from the base of the shank, partially inwardly toward the center of the shank. Also the method of manufacturing the device.

13 Claims, 2 Drawing Sheets

REINFORCED POURING ASSEMBLY AND ITS METHOD OF CONSTRUCTION

The subject of the present invention is a device for perforating a pack made of flexible synthetic material, of the type comprising a closing-off and pouring assembly consisting of a cylindrical shank and of a plug interacting with the said shank and equipped with means for cutting and perforating the wall of the pack as a result of screwing or pressure, in order to make it possible to poor a liquid contained in the said pack.

Devices of this type are known per se.

They have, for example, been the subject of U.S. Pat. No. 4,440,316 and the patent application FR No. 85.13,204 in the applicant's name.

These devices of the prior art are entirely satisfactory, but can still be improved in terms of the partial or complete cutting of the slug or of the region of film to be opened in order to obtain a pouring orifice.

The object of the invention is to overcome these disadvantages.

According to the invention, this result is achieved with a device for perforating a pack made of flexible synthetic material, of the type comprising a closing-off and pouring assembly consisting of a cylindrical shank and of a plug interacting with the said shank and equipped with means for cutting and perforating the wall of the pack as a result of screwing or pressure in order to make it possible to pour a liquid contained in the said pack, characterised in that it consists of a reinforcement of material projecting inwards relative to the base of the shank in the region of the zone to be cut, the said reinforcement being integral with the said shank.

As a result of this structure, all the disadvantages of the devices of the prior art are avoided, particularly the risk that the zone to be perforated wil be deformed as a result of an elastic effect instead of being actually cut.

In fact, the zone which is usually deformed as a result of elasticity or substantial elongation is engaged by the device according to the invention at a different angle, the force exerted by the cutting means being distributed and being supported not by a searing stress line, but by a surface offering greater resistance, naturally within limits compatabile with a manual force of which any user is capable.

The material reinforcement can be obtained in serveral ways.

Thus, for example, it can be used integrally with the shank of the closing-off assembly.

However, this structure requires a highly specific abutment for fastening the shank to the tubular sleeve forming the pack, and this presents problems because the shank is usually together with its plug. The inner zone is therefore inaccessible.

According to a preferred alternative embodiment, the reinforcement will be produced as a result of a creep of material in the region of the base during the fastening of the shank to the sleeve, the said base, before its fastening, incorporating by virtue of manufacture an annular bead which is substantially in the vertical extension of the shank and which creeps at least partially towards the inside of the shank and perpendicularly relative to this when the closing-off assembly is welded to the film sleeve during shaping.

The invention will be understood better from the following description made with reference to the accompanying diagrammatic drawings in which.

Figure 1A:
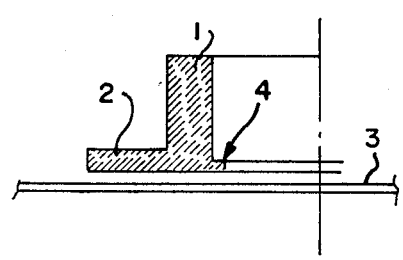
FIGS. 1a and 1b illustrate the first alternative embodiment of the invention.
Figure 1B:
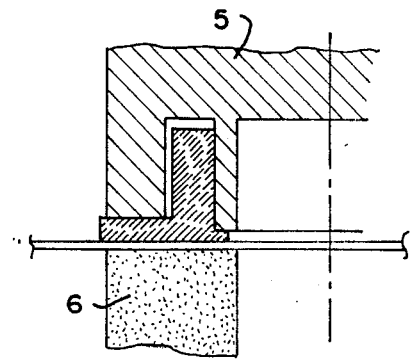

Reference must first be made to FIGS. 1a and 1b.

The closing-off assembly comprises essentially a cylindrical shank (1) ending, in its lower part, in a circular base (2).

This assembly is intended to be attached by welding to a film sleeve (3) at the moment when the latter is shaped on a mandril into individual bags intended for the packaging of nutritious or medical liquids.

An inner reinforcement (4) produced integrally with the shank is shown on this base arranged in the plane of the base.

FIG. 1b illustrates the welding of this assembly to the film by means of an abutment (5) of specific shape interacting with a heating element (thermal or pulse welding) or vibrating element (ultrasonic welding) designated by (6).

The system is adopted in this form when the perforators used are of high cost and therefore intended to be supplied in units for a plurality of bags, for example sold in the form of strings or other forms of multiple packaging.

According to a preferred embodiment of the invention illustrated in FIGS. 2a to 2e, all else otherwise being the same, the reinforcement designated by (4) in FIG. 1a will be replaced by an angular bead (7) integral with the shank of the closing-off assembly.

Figure 2A:
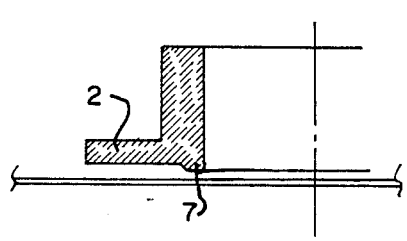
FIGS. 2a to 2e illustrate a second preferred alternative embodiment of the invention.
Figure 2B:
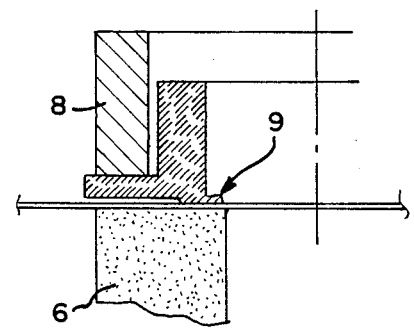
Figure 2C:
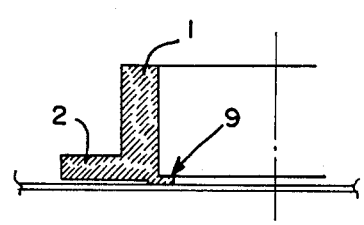

For the welding shown in FIG. 2b, an abutment (8) external to the shank and to the welding assembly (6) is used in the conventional way. The bead (7) thus experiences creeping and is converted into a reinforcement (9) forming an inner collar, as shown in FIG. 2c.

Figure 2D:
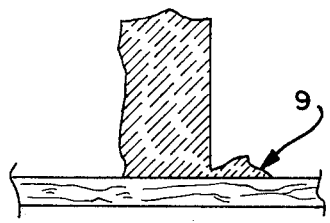

The structure of the reinforcement (9) is shown more accurately in FIG. 2d.

Figures 2E, 3A, 3B:
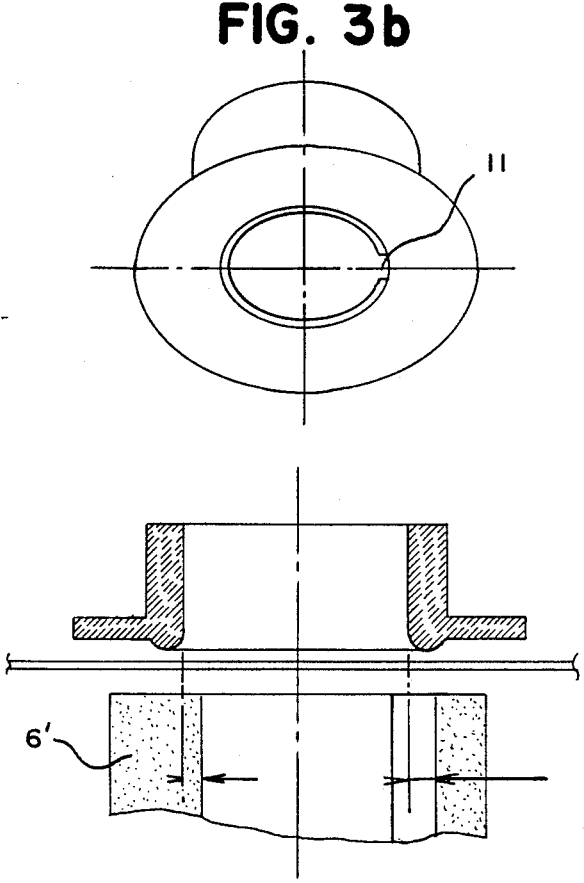
FIGS. 3a and 3b show an alternative embodiment of the device of FIGS. 2a to 2e.

It will be appreciated that, as illustrated in FIG. 2e, the cutting means (10) forming an integral part of the closing-off assembly will have a better support for cutting the reinforcement (9) in line with the shank than if there were no such support. The cut will be clean without pulling or tearing.

According to an alternative embodiment, the welding tool (6') will have a special profile, so that the reinforcement is present only over some of the periphery of the zone to be cut. This results in the structure of FIG. 3b, in which a zone (11) preserves the structure without reinforcement of the prior art.

Thus, the cut-out slug of film remains secured to the sleeve and cannot fall into the bag.

I claim:

1. In a device for perforating a pack made of flexible synthetic material and having a closing-off and pouring assembly including a cylindrical shank and a plug for interacting with the shank and including means for cutting and perforating the pack in order to access a liquid contained in the pack, the improvement which comprises:

a reinforcement attached to and extending from base portions of the shank, partially inwardly toward center portions of the shank, wherein the reinforcement overlies the pack in a region where the pack is to be perforated.

2. The device of claim 1 wherein the reinforcement is integral with the shank.

3. The device of claim 2 wherein the reinforcement is an integral rim formed at the base of the shank.

4. The device of claim 2 wherein the reinforcement is a flattened, annular bead formed on the base of the shank.

5. The device of claim 1 wherein the reinforcement remains attached to the shank after the cutting and perforating of the pack.

6. The device of claim 5 wherein only portions of the reinforcement extend inwardly toward the center of the shank.

7. The device of claim 1 wherein the reinforcement lies in a plane defined by the base of the shank.

8. A method for manufacturing a pouring assembly for a pack made of flexible synthetic material, comprising the steps of:
providing a shank having a reinforcement attached to and extending from base portions of the shank, partially inwardly toward center portions of the shank;
providing a film of flexible synthetic material forming the pack; and
welding the shank to the film so that the reinforcement overlies the film and separates the film from means for cutting and perforating the pack associated with the pouring assembly of the pack.

9. The method of claim 8 wherein the welding is performed by positioning the shank and the film between a heating element and an abutment for interacting with the heating element.

10. The method of claim 9 wherein the abutment is recessed to receive the shank and the reinforcement.

11. A method for manufacturing a pouring assembly for a pack made of flexible synthetic material, comprising the steps of:
providing a shank having an annular bead extending from base portions of the shank;
providing a film of flexible synthetic material forming the pack; and
welding the shank to the film by positioning the shank, the annular bead and the film between a heating element and an abutment for interacting with the heating element, compressing the annular bead and forcing the annular bead outwardly to form a reinforcement extending from inner portions of the shank and positioned to receive means for cutting and perforating the pack associated with the pouring assembly of the pack.

12. The method of claim 11 wherein only portions of the reinforcement extend inwardly toward the center of the shank.

13. The method of claim 12 wherein the abutment is laterally offset from the heating element.

* * * * *